United States Patent [19]
St. Clair et al.

[11] Patent Number: 5,922,781
[45] Date of Patent: Jul. 13, 1999

[54] WEATHERABLE RESILIENT POLYURETHANE FOAMS

[75] Inventors: David John St. Clair; Hector Hernandez, both of Houston, Tex.

[73] Assignee: Shell Oil Company, Houston, Tex.

[21] Appl. No.: 09/081,559

[22] Filed: May 19, 1998

Related U.S. Application Data

[60] Provisional application No. 60/047,520, May 23, 1997.

[51] Int. Cl.$^6$ .................................................. C08G 18/32
[52] U.S. Cl. ............................................................. 521/170
[58] Field of Search ............................................... 521/170

[56] References Cited

U.S. PATENT DOCUMENTS

| | | | |
|---|---|---|---|
| 4,242,468 | 12/1980 | Baack et al. | 521/170 |
| 4,275,172 | 6/1981 | Barth et al. | 521/122 |
| 4,689,357 | 8/1987 | Hongu et al. | 521/112 |
| 4,916,167 | 4/1990 | Chen et al. | 521/170 |
| 4,939,184 | 7/1990 | Kennedy | 521/170 |
| 5,011,908 | 4/1991 | Hager | 521/174 |
| 5,100,926 | 3/1992 | Kondo et al. | 521/163 |
| 5,171,759 | 12/1992 | Hagar | 521/174 |
| 5,710,192 | 1/1998 | Hernandez | 521/155 |

*Primary Examiner*—Morton Foelak
*Attorney, Agent, or Firm*—Beverlee G. Steinberg

[57] ABSTRACT

There is provided a weatherable polyurethane foam produced from a polydiene diol having a number average molecular weight from 1,000 to 20,000 and a functionality of from 1.6 to 2, an aliphatic or cycloaliphatic polyisocyanate, and a stabilizer. The polydiene diol foams have excellent stability under sunlight exposure.

14 Claims, No Drawings

WEATHERABLE RESILIENT POLYURETHANE FOAMS

This application claims the benefit of U.S. Provisional Application No. 60/047,520, filed May 23, 1997, the entire disclosure of which is hereby incorporated by reference.

FIELD OF THE INVENTION

This invention relates to weatherable, flexible polyurethane foams containing a polyol and aliphatic or cycloaliphatic isocyanates, particularly a hydrogenated polybutadiene diol and aliphatic or cycloaliphatic isocyanates.

BACKGROUND OF THE INVENTION

Polyurethane foams having high resilience are typically produced from a polyether triol and an isocyanate. The polyether triols typically have a number average molecular weight from 4,500 to 6,000 and an average functionality of from 2.4 to 2.7 hydroxyl groups per molecule. Toluene diisocyanate, diphenyl methane diisocyanate, toluene diisocyanate/diphenyl methane diisocyanate mixtures, and modified toluene diisocyanate or diphenyl methane diisocyanate versions are used to produce foams with broad processing latitude. Isocyanate functionality is typically 2.0, and in most cases not higher than 2.3 isocyanate groups per molecule. The polyether triols form resilient foams when combined with isocyanates having from 2.0 to 2.3 isocyanate groups per molecule under conditions which promote foaming. However, polyethers degrade when exposed to ultraviolet light and polyesters degrade by hydrolysis under hot, humid conditions.

U.S. Pat. No. 4,939,184 described the production of polyurethane foams from polyisobutylene triols and diols which were prepared cationically. The polyisobutylenes are premixed with an isocyanate, namely an isocyanate which is a mixture of meta- and para- isomers of toluene diisocyanate having a functionality of 2.0. Then water was added as a blowing agent to form the polyurethane foam. Foams obtained were of low resilience and were useful in energy absorbing applications.

U.S. patent application Ser. No. 08/494,640, incorporated herein by reference, described a high resilience polyurethane foam produced from a polydiene diol. The foam's resiliency was achieved by adding an aromatic polyisocyanate having a functionality of from 2.5 to 3.0 isocyanate groups per molecule to assure adequate crosslinking. The polydiene diol foams produced showed excellent humid aging properties in comparison to conventional polyurethane foams.

U.S. patent application Ser. No. 08/724,940, incorporated herein by reference, described a high resilience, high tear resistance polyurethane foam produced from a polydiene diol. The foam's resiliency was achieved by selecting an appropriate amount of a aromatic polyisocyanate having a functionality of from 1.8 to 2.5 isocyanate groups per molecule to assure adequate crosslinking. The polydiene diol foams produced showed excellent tear resistance and were near white in color.

In some applications for the above described foams, the foams will be exposed to the weather. These foams will degrade under prolonged exposure to heat, humidity and sunlight. It is desirable to have a resilient, flexible, light-stable foam which can resist degradation under prolonged exposure to the weather.

SUMMARY OF THE INVENTION

Surprisingly, it has been found that a foam made from a hydrogenated polybutadiene diol and an aliphatic or cycloaliphatic isocyanate is resistant to degradation by ultraviolet light. The present invention provides a polyurethane foam composition comprising:

a hydrogenated polydiene diol having a number average molecular weight from 1,000 to 20,000;

an aliphatic or cycloaliphatic polyisocyanate;

a stabilizer; and a blowing agent.

DETAILED DESCRIPTION OF THE INVENTION

The present invention is a durable resilient polyurethane foam preferably comprising 100 parts by weight (pbw) of a polydiene diol having a number average molecular weight from 1,000 to 20,000, more preferably from 1,000 to 10,000, most preferably from 3,000 to 6,000. To this is added from 20 to 60 pbw of an aliphatic or cycloaliphatic polyisocyanate, a stabilizer, and a blowing agent. In a preferred embodiment, the polyisocyanate used has a functionality of from 2.0 to 3.0 isocyanate groups per molecule and the polydiene diol is hydrogenated and has a functionality of from 1.6 to 2, more preferably from 1.8 to 2, hydroxyl groups per molecule. The isocyanate is preferably added at a concentration which gives an equal number of isocyanate groups and hydroxyl groups. The foam displays excellent resistance to ultraviolet light.

The polydiene diols used in this invention are prepared anionically such as described in U.S. Pat. Nos. 5,376,745, 5,391,663, 5,393,843, 5,405,911, and 5,416,168 which are incorporated by reference herein. Polymerization of the polydiene diols commences with a monolithium initiator containing a protected hydroxyl group or dilithium initiator which polymerizes a conjugated diene monomer at each lithium site. Due to cost advantages, the conjugated diene is typically 1,3-butadiene or isoprene, although other conjugated dienes will also work well in the invention. When the conjugated diene is 1,3-butadiene and when the resulting polymer will be hydrogenated, the anionic polymerization may be controlled with structure modifiers such as diethylether or 1,2-diethoxyethane to obtain the desired amount of 1,4-addition.

Anionic polymerization is terminated by addition of a functionalizing agent prior to termination. Functionalizing agents used are like those in U.S. Pat. Nos. 5,391,637, 5,393,843, and 5,418,296, incorporated herein by reference. The preferred functionalizing agent is ethylene oxide.

The polydiene diols provide stable, resilient foams when the polydiene diol is hydrogenated, although unsaturated polydiene diols will also result in polyurethane foams having high resilience. The polydiene diols have from 1.6 to 2, more preferably from 1.8 to 2 terminal hydroxyl groups per molecule. An average functionality of, for example, 1.8 means that about 80% of the molecules are diols and about 20% of the molecules are mono-ols. Since the majority of the product's molecules have two hydroxyl groups, the product is considered a diol. The polydiene diols of the invention have a number average molecular weight between 1,000 and 20,000, more preferably from 1,000 to 10,000, most preferably from 3,000 to 6,000. Hydrogenated polybutadiene diols having a 1,4-addition between 40% and 60% are preferred.

The polydiene diols are preferably hydrogenated such that at least 90%, preferably at least 95%, of the carbon-to-carbon double bonds in the diols are saturated. Hydrogenation of these polymers and copolymers may be carried out by a variety of well established processes including hydrogenation in the presence of such catalysts as RANEY® Nickel (from W. R. Grace & Co.), noble metals such as platinum and the like, soluble transition metal catalysts and titanium catalysts as described in U.S. Pat. No. 5,039,755, incorporated herein by reference.

The diene microstructures are typically determined by $C^{13}$ nuclear magnetic resonance (NMR) in chloroform. It is desirable for polybutadiene diols to have at least about 40% 1,2-butadiene addition because, after hydrogenation, the polymer will be a waxy solid at room temperature if it contains less than about 40% 1,2-butadiene addition. Preferably, the 1,2-butadiene content is between about 40 and 60%. Isoprene polymers typically have at least 80% 1,4-isoprene addition in order to reduce the glass transition temperature ($T_g$) and viscosity.

The polydiene diols used in the invention typically have hydroxyl equivalent weights between about 500 and about 10,000, more preferably between 500 and 5,000, most preferably between 1,500 and 3,000. Thus, for the polydiene diols, suitable number average molecular weights will be between 1,000 and 20,000, more preferably between 1,000 and 10,000, most preferably between 3,000 and 6,000. The hydrogenated polydiene diol of the Examples had a number average molecular weight of 3300, a functionality of 1.92 and a 1,2-butadiene content of 54%. The polymer was hydrogenated to remove more than 99% of the carbon to carbon double bonds.

The number average molecular weights referred to herein are number average molecular weights measured by gel permeation chromatography (GPC) calibrated with polybutadiene standards having known number average molecular weights. The solvent for the GPC analysis is tetrahydrofuran.

The isocyanates used in this invention are aliphatic or cycloaliphatic polyisocyanates. As the saturated polydiene diol has a functionality of about 2 hydroxyl groups per molecule, a polyisocyanate having a functionality of from 1.8 to 3.0, preferably 2.5 to 3.0, is used to achieve a crosslink density that results in a stable, high loadbearing and high resilient foam. Using isocyanates of lower functionality results in less stable foams having lower loadbearing capacity and having reduced resiliency. Higher isocyanate functionality will result in foam having a too high closed cell content which will negatively influence the physical properties.

Examples of suitable aliphatic or cycloaliphatic polyisocyanates include the DESMODUR® series of isocyanates (from Bayer). These include DESMODUR® Z-4370, a cycloaliphatic triisocyanate based on isophorone diisocyanate (70% w in xylene) having a functionality of 3.0, DESMODUR® N-3400, an aliphatic di/triisocyanate based on hexane diisocyanate having a functionality of 2.5, and DESMODUR® W, a cycloaliphatic dicyclohexylmethane diisocyanate having a functionality of 2.0.

Antioxidants and ultraviolet stabilizers are also added to further increase the heat and light stability of the foam. As used herein, the antioxidant/stabilizer combination will be called a stabilizer package.

The primary component of the antioxidant portion of the stabilizer package will be a hindered phenol type antioxidant. Examples of commercially available antioxidants of this type are ETHANOX® 330 (from Albemerle Corporation), CYANOX® 2246 (from American Cyanamid), and IRGANOX® 1010 and IRGANOX® 1076 (from Ciba Geigy). A wide variety of secondary antioxidants and synergists can also be included in the formulation. Examples include zinc dialkyl dithiocarbamates such as butyl ZIMATE® (from R. T. Vanderbilt), phosphite esters such as WESTIN™ 618 (from General Electric), and sulfur bearing compounds such as dilaurylthio-dipropionate, CYANOX® LTDP (from American Cyanamid). Antioxidants are typically used in the formulation at concentrations from 0.5 to 1 percent by weight (% w).

The UV inhibitor portion of the stabilizer package will typically be composed of a combination of a UV light absorbing type compound and a hindered amine light stabilizer. Combinations of stabilizers are often more effective, due to the different mechanisms of degradation to which various polymers are subject. A combination of an ultraviolet light absorber and a hindered amine light stabilizer has been found to provide good resistance to degradation by sunlight in the foams of the invention. Typical absorbing type UV inhibitors include the benzophenone type such as CYASORB® UV 531 (from American Cyanamid) and the benzotriazole type such as TINUVIN® P and TINUVIN® 328 (Ciba Geigy). Typical hindered amine light stabilizers include TINUVIN® 770 and TINUVIN® 123 (Ciba Geigy) and SANDUVOR® 3056 (American Cyanamid). UV inhibitors which contain a metal, such as the nickel containing UV inhibitor, CYASORB® UV 1084 (American Cyanamid) can also be used. These UV inhibitors will generally be included in the formulation at concentrations from 0.5 to 6% w.

The essential components of the polyurethane foams of this invention therefore are the polydiene diol, the aliphatic or cycloaliphatic polyisocyanate, a stabilizer, and a blowing agent. The concentration of the blowing agent may be varied to alter the foam density.

A variety of blowing agents may be used. Suitable blowing agents include halogenated hydrocarbons, aliphatic alkanes, and alicyclic alkanes, as well as water which is often referred to as a chemical blowing agent. Due to the ozone depleting effect of the fully chlorinated, fluorinated alkanes (CFC's), the use of this type of blowing agent is not preferred, although it is possible to use them within the scope of the present invention. The halogenated alkanes, wherein at least one hydrogen atom has not been substituted by a halogen atom (the HCFC's) have a lower ozone depleting potential and therefore are the preferred halogenated hydrocarbons to be used in physically blown foams. A very suitable HCFC type blowing agent is 1-chloro-1,1-difluoroethane. Even more preferred as blowing agents are hydrofluorohydrocarbons which are thought to have a zero ozone depletion potential.

The use of water as a (chemical) blowing agent is also well known. Water reacts with isocyanate groups according to the well known $NCO/H_2O$ reaction, thereby releasing carbon dioxide which causes the blowing to occur.

The aliphatic and alicyclic alkanes, finally, were developed as alternative blowing agents for the CFC's. Examples of such alkanes are n-pentane, isopentane, and n-hexane (aliphatic), and cyclopentane and cyclohexane (alicyclic).

It will be understood that the above blowing agents may be used singly or in mixtures of two or more. Of the blowing agents mentioned, water and cyclopentane have been found to be particularly suitable as blowing agents for the purpose of the present invention. The amounts wherein the blowing agents are to be used are those conventionally applied, i.e. in the range of from 0.1 to 5 pbw per 100 parts of polydiene diol in case of water and in the range of from about 0.1 to 20 pbw per 100 parts of polydiene diol in case of halogenated hydrocarbons, aliphatic alkanes, and alicyclic alkanes. Preferably, the blowing agent is water.

Water is preferably added in an amount of from 0.5 to 3.5 parts by weight (pbw) per 100 parts of polydiene diol. Preferably, distilled or de-mineralized water is used, as impurities may affect the foam reaction.

Typically, catalysts and a surfactant are needed in the preparation of the foams. Surfactants improve the miscibility of the components, which in turn promotes the hydroxyl/isocyanate reaction. Further, the surface tension of the mixture is reduced, which influences the cell nucleation and stabilizes the expanding foam, leading to a fine cell structure. An example of a silicon surfactant useful in making polyurethane foams from polydiene diols is DABCO® DC-5160 silicone surfactant, from Air Products and Chemicals. The surfactant, if present, is normally added in an amount of from 0.05 to 5 pbw per 100 pbw of the polydiene diol (0.05–5 phr).

In principle any catalyst known to catalyze one or more of the foaming reactions in the system may be used. Examples of suitable catalysts are described in European patent specification No. 0 358 282 and include amines such as tertiary amines, salts of carboxylic acids, and organometallic catalysts. Amine catalysts found useful in making polyurethane foams from polydiene diols are DABCO® 33-LV amine catalyst and DABCO® DC-1 delayed action amine catalyst, both from Air Products and Chemicals. Examples of suitable tertiary amines are triethylene diamine, N-methylmorpholine, N-ethylmorpholine, diethyl-ethanolamine, N-cocomorpholine, 1-methyl-4-dimethyl-aminoethylpiperazine, 3-methoxypropyldimethylamine, N,N,N'-tri-methylisopropyl propylenediamine, 3-diethylamino propyl-diethylamine, dimethylbenzylamine and dimethylcyclohexylamine. An example of a carboxylic acid salt useful as a catalyst is sodium acetate. Suitable organometallic catalysts include stannous oleate, stannous oleate, stannous acetate, stannous laureate, lead octoate, lead naphthenate, nickel naphthenate, cobalt naphthenate and dibutyltin dilaurate. Further examples of organometallic compounds useful as catalyst in the production of polyurethanes are described in U.S. Pat. No. 2,846,408. Of course, mixtures of two or more of the above catalysts may also be applied. The amount in which the catalyst, or the mixture of catalysts, is used normally lies in the range of from 0.01 to 5.0 pbw, preferably in the range of from 0.2 to 2.0 pbw, per 100 parts of polydiene diol.

Tackifying resins and oil can also be added to modify the tack and hardness of the foams. However, to maintain the good durability of the foams, only hydrogenated tackifying resins and highly saturated oils should be used.

Other ingredients like fire retardants, fillers, etc. may be added by those skilled in the art of making foam.

The polyurethane foams are preferably prepared by blending all of the components except the isocyanate. The polydiene diol is preferably preheated to reduce viscosity prior to blending. After blending, the aliphatic or cycloaliphatic polyisocyanate is quickly added and briefly stirred before pouring the mixture into a mold to hold the expanding foam.

The polyurethane foams of the present invention are useful for making articles such as long lasting seat cushions and gaskets and seals for use in severe exposure environments.

DETAILED DESCRIPTION OF PREFERRED EMBODIMENTS

The polyurethane foam may be subjected to a curing treatment by heating the foam to an elevated temperature, usually between 100° C. and 160° C. for a certain period of time, typically in the range from 10 minutes to 96 hours, preferably from 30 minutes to 48 hours. Usually, however, the heat generated by the exothermic polyurethane foaming reaction is sufficient to ensure complete curing, and the process is carried out adiabatically.

According to a more preferred embodiment, the present invention relates to a resilient polyurethane foam comprising 100 parts by weight of a hydrogenated polydiene diol having a number average molecular weight from 3,000 to 6,000 and a functionality of from 1.8 to 2.0 hydroxyl groups per molecule, from 0.5 to 3.5 parts by weight of water, an aliphatic or cycloaliphatic polyisocyanate having a functionality of from 2.0 to 3.0 isocyanate groups per molecule at a concentration which will give an equal number of isocyanate and hydroxyl groups, from 0.4 to 0.8 parts by weight of an amine catalyst, from 0.3 to 0.6 parts by weight of a tin catalyst, and from 0 to 0.06 parts by weight of a silicon surfactant. The foam shows superior resistance to degradation compared to conventional foams made with polyether polyols and aromatic isocyanates.

The polyurethane foam is preferably produced by a process comprising the steps of combining a hydrogenated polydiene diol having a number average molecular weight from 1,000 to 20,000 and a functionality of from 1.6 to 2 hydroxyl groups per molecule with an aliphatic or cycloaliphatic polyisocyanate having a functionality of from 2.0 to 3.0 isocyanate groups per molecule and a stabilizer; and foaming the combined polydiene diol and aliphatic polyisocyanate to form a polyurethane foam exhibiting stability upon exposure to sunlight.

The polyurethane foams of the present invention are useful for making articles such as long lasting seat cushions and gaskets and seals for use in severe exposure environments.

The following examples are not intended to limit the present invention to specific embodiments although each example may support a separate claim which is asserted to be a patentable invention.

EXAMPLES

Seven foams were prepared using hydrogenated polydiene diol, isocyanate, catalyst and surfactant. Six of the foams were made with an aliphatic or cycloaliphatic isocyanate, producing white foams. One of the seven polydiene foams was made with an aromatic isocyanate, producing a brownish-tan foam, and is presented as a comparative example. Three foams also contained a stabilizer package. An eighth foam, also used as a comparative example, was prepared using a polyether triol and an aromatic isocyanate. The formulations of the foams are shown in Table 1.

The hydrogenated polydiene diol of the Examples had a number average molecular weight of 3300, a functionality of 1.92 and a 1,2-butadiene content of 54%. The polymer was hydrogenated to remove more than 99% of the carbon to carbon double bonds. The triol used was CARADOL™ 36-03, a polypropylene oxide polyether triol with a hydroxyl number of 36 and a functionality of 2.7 (from Shell Chemicals International).

In the typical preparation, the polymer was preheated to 80° C. All the components in the formulation except the isocyanate were weighed into a dried can and mixed using a CAFRAMO® stirrer equipped with a 2-inch, regular pitch impeller. Isocyanate was then added and mixing was continued for about 45 seconds. By this time the mass would begin to foam and was poured into a paper bucket. After the foam stabilized and a skin formed, the foam was post-baked in an oven for ten (10) minutes at 110° C. Cube-shaped specimens, 50 mm on each side, were cut from the bun for measurement of foam density and compression hardness.

After initial property testing, the foams were placed in wire cages and were exposed to outside weather conditions in Houston, Tex., USA for approximately 7½ months, beginning in August. Following exposure, the foam specimens were retrieved and compression hardness tests were repeated.

Density

Density was determined from the weight of a block and its dimensions. Results are given in Table 2.

Compression Hardness

Compression hardness (ASTM D3574) was measured in the cube specimens both before and after weathering. The cubes were compressed twice to 25% of their initial dimensions and then compressed to 50% of their initial dimensions. An INSTRON® testing machine was used. After 1 minute at 50% compression, the load was measured and the compression hardness was calculated. Results are given in Table 2.

TABLE 1

Foam Formulations

| | Foam 1 (pbw) | Foam 2 (pbw) | Foam 3 (pbw) | Foam 4 (pbw) | Foam 5 (pbw) | Foam 6 (pbw) | Foam 7 (pbw) | Foam 8 (pbw) |
|---|---|---|---|---|---|---|---|---|
| Polymer | | | | | | | | |
| Triol | 100 | | | | | | | |
| Diol | | 100 | 100 | 100 | 100 | 100 | 100 | 100 |
| Isocyanate | | | | | | | | |
| CARADATE ™ 30[1] | 23.4 | 22.9 | | | | | | |
| DESMODUR ® W | | | 22.6 | 22.6 | | | | |
| DESMODUR ® N-3400 | | | | | 33.1 | 33.1 | 33.1 | 33.1 |
| Catalyst | | | | | | | | |
| DABCO ® T-12 | | | 0.5 | 0.5 | 0.4 | 0.3 | 0.4 | 0.4 |
| DABCO ® 33-LV | 0.4 | 0.4 | 0.4 | 0.4 | 0.4 | 0.4 | 0.4 | 0.4 |
| DABCO ® DC-1 | 0.3 | 0.3 | 0.3 | 0.3 | 0.3 | 0.3 | 0.3 | 0.3 |
| Surfactant | | | | | | | | |
| DABCO ® 5150 | 0.02 | 0.02 | 0.02 | 0.02 | 0.02 | 0.02 | 0.02 | 0.02 |
| Blowing Agent | | | | | | | | |
| Water | 1.0 | 1.0 | 1.0 | 1.0 | 1.0 | 1.0 | 1.0 | 1.0 |
| Antioxidant/Stabilizer | | | | | | | | |
| IRGANOX ® 1076 | | | | 0.5 | | | 0.5 | 0.5 |
| TINUVIN ® 328 | | | | 1.0 | | | 1.0 | 1.0 |
| TINUVIN ® 123 | | | | 1.0 | | | 1.0 | 1.0 |

[1] a polyisocyanate based on diphenyl methane diisocyanate (MDI), with a functionality of 2.6 (from Shell International Chemicals)

TABLE 2

Foam Properties

| | Foam 1 | Foam 2 | Foam 3 | Foam 4 | Foam 5 | Foam 6 | Foam 7 | Foam 8 |
|---|---|---|---|---|---|---|---|---|
| Initial Properties | | | | | | | | |
| Density (gm/l) | 157 | 96 | 98 | 121 | 123 | 116 | 122 | 115 |
| Compression Hardness (MPa) | 461 | 199 | 316 | 522 | 571 | 426 | 444 | 425 |
| Weathered Properties | | | | | | | | |
| Compression Hardness (MPa) | 512 | 187 | 171 | 497 | 352 | 248 | 444 | 464 |
| Change on Aging (%) | 11 | −6 | −46 | −5 | −38 | −42 | 0 | 9 |
| Appearance | a | b | c | b | d | d | b | b | a) Obvious surface degradation. Surface, especially surface facing the sun, was brittle and powdery when rubbed.
b) No indication of any degradation was apparent.
c) Very slight tack on surface facing the sun.
d) Quite tacky on all surfaces, especially the surface facing the sun.

All eight of the foams displayed good elasticity and resilience. However, after aging, conventional Foam 1 showed obvious signs of degradation. The surface had embrittled and when rubbed with a finger, it left a powdery residue on the finger. The surfaces facing the sun suffered the most embrittlement. The degradation seemed to be limited to the surface since the compression hardness increased only slightly. Replacing the polyether triol with a polydiene diol (Foam 2) substantially improves the outdoor durability of polyurethane foams based on the aromatic isocyanate.

Foams 3, 5 and 6, which were made with aliphatic or cycloaliphatic isocyanates and no stabilizer, became tacky. These three foams also suffered about a 40% drop in compression hardness.

Foams 4, 7 and 8, based on aliphatic or cycloaliphatic isocyanates and containing the stabilizer package, displayed excellent stability, showing almost no change in properties. Qualitatively, there was no change in the surfaces and the compression hardness values changed very little upon aging.

While this invention has been described in detail for purposes of illustration, it is not construed as limited thereby but is intended to cover all changes and modifications within the spirit and scope thereof.

We claim:

1. A polyurethane foam composition consisting of:
   a hydrogenated polydiene diol having a number average molecular weight from 1,000 to 20,000;
   an aliphatic or cycloaliphatic polyisocyanate;
   a stabilizer; and
   a blowing agent.

2. A composition according to claim 1 wherein the polydiene diol has a functionality of from 1.6 to 2 hydroxyl groups per molecule, and wherein the polyisocyanate has a functionality of from 1.8 to 3.0 isocyanate groups per molecule.

3. A composition according to claim 2 wherein the polyisocyanate is at a concentration which gives an equal number of isocyanate groups and hydroxyl groups.

4. A composition according to claim 3 wherein the blowing agent is water and wherein the concentration of water is between about 0.5 parts by weight and about 3.5 parts by weight per hundred parts diol.

5. A composition according to claim 2, wherein the polydiene diol is a polybutadiene diol.

6. A composition according to claim 2, wherein the polydiene diol has a number average molecular weight of 3,000 to 6,000.

7. A composition according to claim 6 wherein the polydiene diol has a functionality of from 1.8 to 2 hydroxyl groups per molecule.

8. A composition according to claim 7, wherein the polydiene diol is a polybutadiene diol.

9. A composition according to claim 8 wherein the polyisocyanate is at a concentration which gives an equal number of isocyanate groups and hydroxyl groups.

10. A polyurethane foam produced by a process consisted of the steps of:
    combining a hydrogenated polydiene diol having a number average molecular weight from 1,000 to 20,000 and a functionality of from 1.6 to 2 hydroxyl groups per molecule with an aliphatic or cycloaliphatic polyisocyanate having a functionality of from 2.0 to 3.0 isocyanate groups per molecule and a stabilizer; and
    foaming the combined polydiene diol and aliphatic or cycloaliphatic polyisocyanate to form a polyurethane foam exhibiting resistance to degradation by sunlight.

11. A polyurethane foam according to claim 10, wherein foaming agents are combined with the polydiene diol prior to combination with the aliphatic or cycloaliphatic polyisocyanate.

12. A polyurethane foam according to claim 11, wherein the foaming agents comprise water, an amine catalyst, a tin catalyst, and a silicon surfactant.

13. A polyurethane foam produced by a process consisting of the steps of:
    mixing 100 parts by weight of a hydrogenated polydiene diol having a number average molecular weight from 1,000 to 10,000 and a functionality of from 1.8 to 2.0 hydroxyl groups per molecule with 1 part by weight of water, 0.7 parts by weight of an amine catalyst, from 0.4 to 0.5 parts by weight of a tin catalyst, 0.02 parts by weight of a silicon surfactant, and 2.5 parts by weight of an antioxidant/stabilizer mix; and
    adding an aliphatic or cycloaliphatic polyisocyanate, wherein the aliphatic or cycloaliphatic polyisocyanate has a functionality of from 2.0 to 3.0 isocyanate groups per molecule and is added at a concentration which gives an equal number of isocyanate groups and hydroxyl groups.

14. A polyurethane foam according to claim 13, wherein the polydiene diol has from 40% to 60% 1,2-addition of butadiene.

* * * * *